United States Patent
Hsu et al.

(10) Patent No.: US 11,427,415 B2
(45) Date of Patent: Aug. 30, 2022

(54) AUTOMATIC LOADING AND UNLOADING DEVICE

(71) Applicant: POU CHEN CORPORATION, Chang Hwa Hsien (TW)

(72) Inventors: Chien-Yu Hsu, Chang Hwa Hsien (TW); Wen-Pao Chang, Chang Hwa Hsien (TW); Yao-Hsin Wang, Chang Hwa Hsien (TW); Chung-Shun Hung, Chang Hwa Hsien (TW)

(73) Assignee: POU CHEN CORPORATION, Chang Hwa Hsien (TW)

( * ) Notice: Subject to any disclaimer, the term of this patent is extended or adjusted under 35 U.S.C. 154(b) by 477 days.

(21) Appl. No.: 16/716,171

(22) Filed: Dec. 16, 2019

(65) Prior Publication Data
US 2020/0198906 A1 Jun. 25, 2020

(30) Foreign Application Priority Data

Dec. 19, 2018 (TW) .................................. 107145999
Oct. 9, 2019 (TW) .................................. 108136662

(51) Int. Cl.
| | |
|---|---|
| *A43D 119/00* | (2006.01) |
| *D05B 33/02* | (2006.01) |
| *D05B 41/00* | (2006.01) |
| *B65G 65/02* | (2006.01) |
| *D05B 3/12* | (2006.01) |
| *D05B 33/00* | (2006.01) |

(52) U.S. Cl.
CPC ............ *B65G 65/02* (2013.01); *A43D 119/00* (2013.01); *D05B 3/12* (2013.01); *D05B 33/00* (2013.01); *D05B 41/00* (2013.01)

(58) Field of Classification Search
CPC ....... A43D 119/00; D05B 33/02; D05B 41/00
USPC ......................................... 414/222.09, 222.13
See application file for complete search history.

(56) References Cited

U.S. PATENT DOCUMENTS

| | | | | | |
|---|---|---|---|---|---|
| 3,868,736 | A | * | 3/1975 | Adamik | A43D 43/06 12/1 B |
| 5,768,732 | A | * | 6/1998 | Blanc | A43D 119/00 12/1 A |
| 6,321,898 | B1 | * | 11/2001 | Inoue | H01L 21/67781 198/465.1 |
| 6,930,762 | B2 | * | 8/2005 | Yamada | G03F 7/70741 700/121 |

(Continued)

OTHER PUBLICATIONS

US 2020/0046082 A1, Luh, Feb. 13 (Year: 2020).*

*Primary Examiner* — Douglas A Hess
(74) *Attorney, Agent, or Firm* — Hamre, Schumann, Mueller & Larson, P.C.

(57) ABSTRACT

An automatic loading and unloading device includes a frame, an unloading unit, a receiving unit and a receiving link unit. The frame defines a processing area, an unloading area and a receiving area. The unloading unit includes an unloading slide rail, and an unloading drive group movably disposed on the unloading slide rail for driving at least one plate to move from the processing area to the unloading area. The receiving unit includes a receiving slide rail, and a receiving lift group movably disposed on the receiving slide rail for driving the at least one plate to move from the unloading area to the receiving area. The receiving link unit interconnects the unloading drive group and the receiving lift group.

12 Claims, 13 Drawing Sheets

(56) References Cited

U.S. PATENT DOCUMENTS

| | | | |
|---|---|---|---|
| 8,215,473 B2* | 7/2012 | Baccini | H01L 21/67721 |
| | | | 414/222.11 |
| 8,827,621 B2* | 9/2014 | Inagaki | H01L 21/67769 |
| | | | 414/940 |
| 9,939,803 B2* | 4/2018 | Regan | A43D 63/00 |
| 10,424,498 B2* | 9/2019 | Hofmeister | H01L 21/67742 |
| 10,682,848 B2* | 6/2020 | Willshere | B41F 15/08 |
| 11,027,486 B2* | 6/2021 | Ploem | B33Y 30/00 |

* cited by examiner

AUTOMATIC LOADING AND UNLOADING DEVICE

CROSS-REFERENCE TO RELATED APPLICATION

This application claims priority to Taiwanese Patent Application No. 107145999, filed on Dec. 19, 2018, and Taiwanese Patent Application No. 108136662, filed on Oct. 9, 2019.

FIELD

The disclosure relates to a loading and unloading system, more particularly to an automatic loading and unloading device.

BACKGROUND

A loading and unloading device of a conventional stitching machine includes a work platform, a loading unit and an unloading unit. The work platform defines a loading area, a processing area, and a receiving area. A stitching machine is provided on the processing area. During processing, an operator can put a plate loaded with two shoe components on the loading area, and the plate is delivered to the processing area for processing the shoe components loaded thereon through the loading unit. Finally, the plate with the processed shoe components is delivered to the receiving area through the unloading unit for the operator to collect the product at the receiving area.

Since the loading area of the loading and unloading device of the conventional stitching machine is away from and is not adjacent to the receiving area, the operator must continually move between the loading area and the receiving area. If two operators must be provided, the labor cost is increased. If an additional receiving device is provided, an additional drive mechanism is required, thereby increasing the cost of the drive mechanism.

SUMMARY

Therefore, an object of the present disclosure is to provide an automatic loading and unloading device that is capable of alleviating at least one of the drawbacks of the prior art.

According to this disclosure, an automatic loading and unloading device is suitable for automatically moving at least one plate. The automatic loading and unloading device includes a frame, an unloading unit, a receiving unit and a receiving link unit. The frame defines a processing area that is suitable for receiving the at least one plate along a transferring direction, an unloading area disposed on one side of the processing area, and a receiving area disposed on one side of the unloading area that is away from the processing area. The unloading unit is disposed on the frame, and includes an unloading slide rail extending along an unloading direction perpendicular to the transferring direction, and an unloading drive group movably disposed on the unloading slide rail for driving the at least one plate to move from the processing area to the unloading area along the unloading direction. The receiving unit is disposed on the frame, and includes a receiving slide rail extending along the transferring direction, and a receiving lift group movably disposed on the receiving slide rail for driving the at least one plate to move from the unloading area to the receiving area along the transferring direction. The receiving link unit interconnects the unloading drive group and the receiving lift group such that when the unloading drive group moves along the unloading slide rail, the unloading drive group can synchronously drive the receiving lift group to move along the transferring direction.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
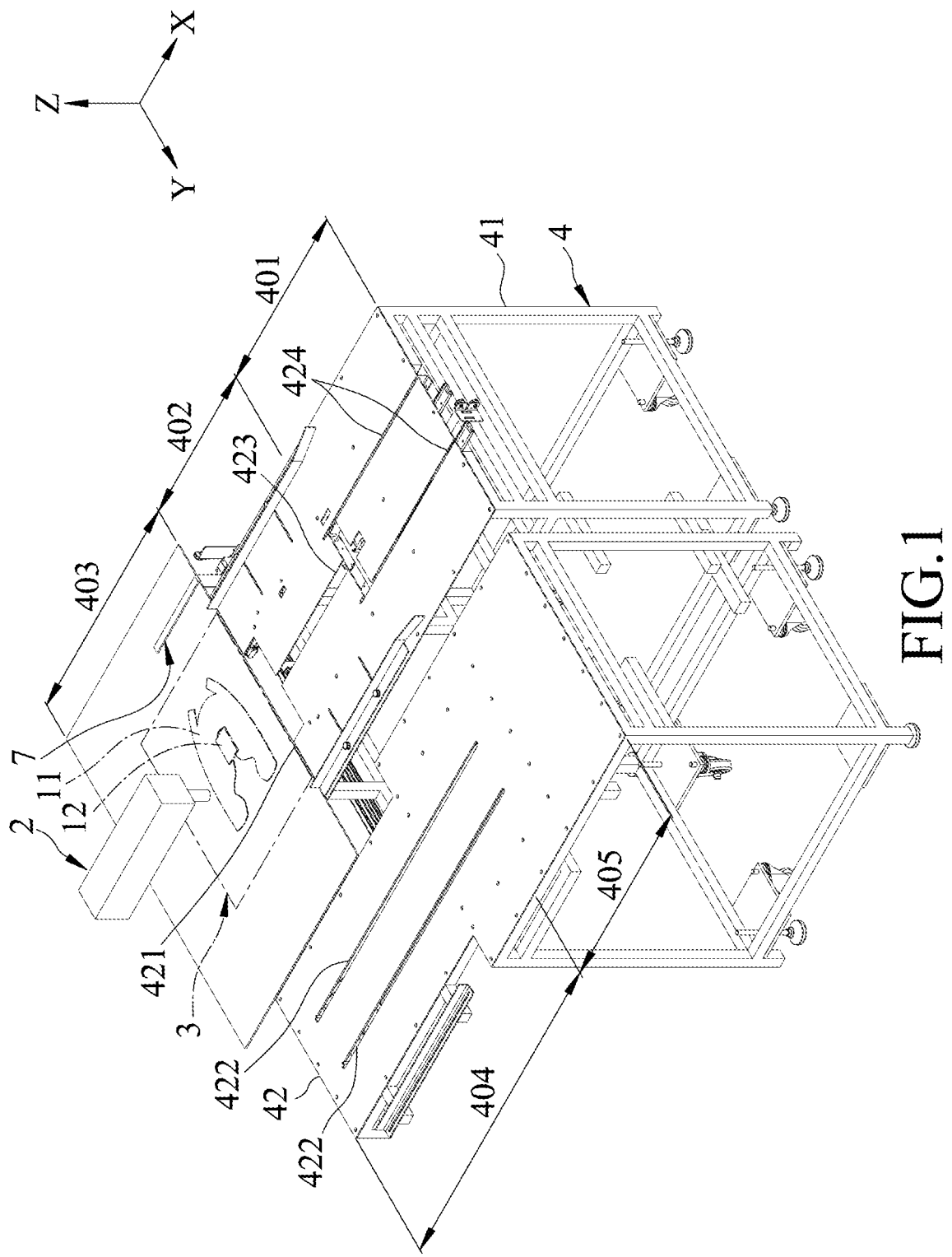
FIG. 1 is a perspective view of an automatic loading and unloading device according to the first embodiment of the present disclosure.

Before the present disclosure is described in greater detail, it should be noted herein that like elements are denoted by the same reference numerals throughout the disclosure.

Figure 2:
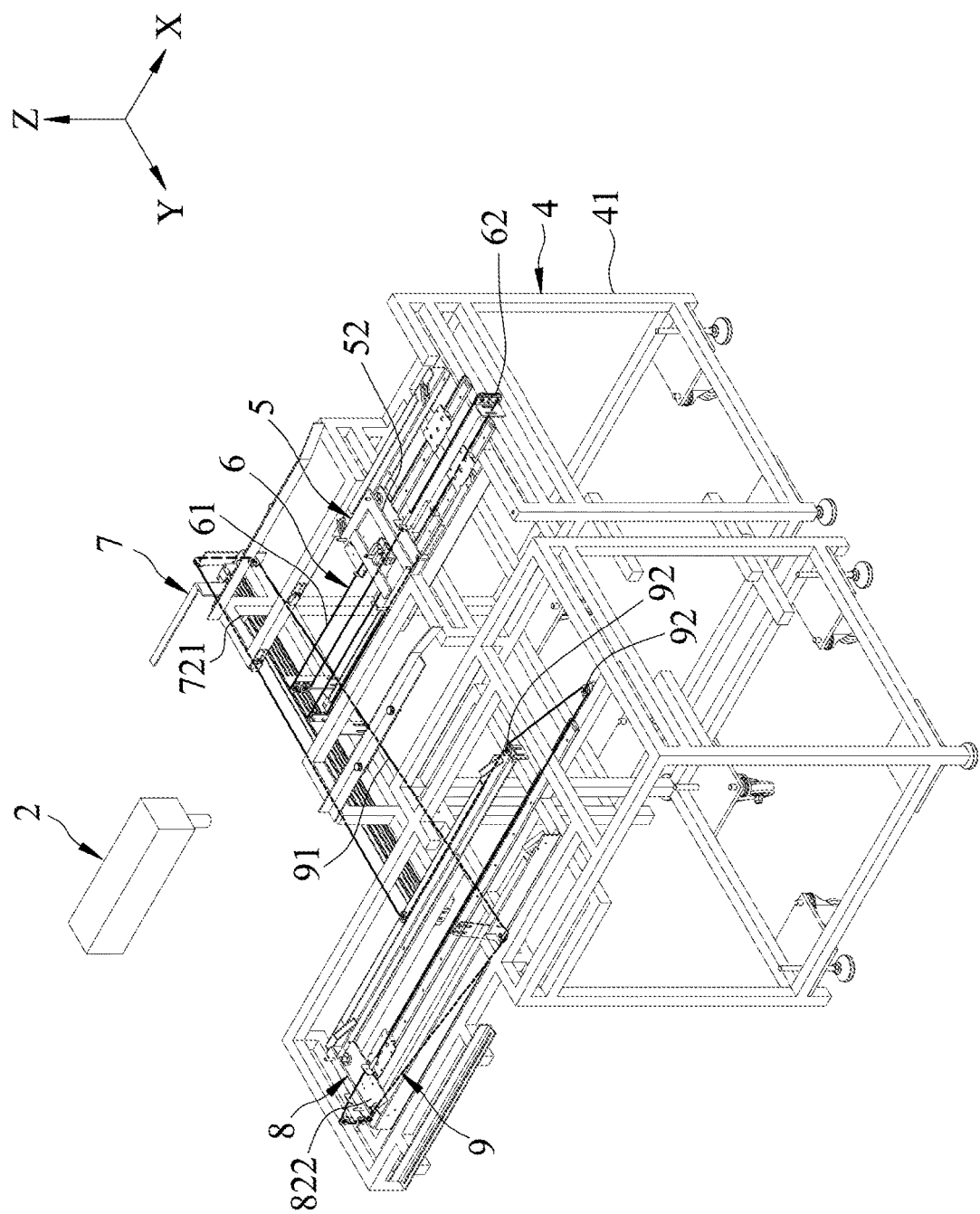
FIG. 2 is a view similar to FIG. 1, but with a platform and a plate being removed for clarity's sake.

Referring to FIGS. 1 and 2, an automatic loading and unloading device according to the first embodiment of the present disclosure is suitable for installing a stitching machine 2, and includes a frame 4, a loading unit 5, a loading link unit 6, an unloading unit 7, a receiving unit 8, and a receiving link unit 9.

The frame 4 defines a preparation area 401, a loading area 402, a processing area 403, an unloading area 404 and a receiving area 405. The preparation area 401, the loading area 402 and the processing area 403 are sequentially arranged along a transferring direction (X). The processing area 403 is located below the stitching machine 2. The unloading area 404 is disposed on one side of the processing area 403 along an unloading direction (Y) perpendicular to the transferring direction (X). The receiving area 405 is disposed on one side of the unloading area 404 that is away from the processing area 403 and that is adjacent to the preparation area 401.

The frame 4 includes a frame body 41, and a platform 42 mounted on the frame body 41. The platform 42 has an area covering the preparation area 401, the loading area 402, the processing area 403, the unloading area 404 and the receiving area 405. The platform 42 is formed with an unloading channel 421 located between the processing area 403 and the loading area 402 and extending along the unloading direction (Y), two receiving channels 422 located in the unloading area 404, a conveying channel 423 located in the loading area 402 and extending along the transferring direction (X), and two loading channels 424 located in the preparation area 401. All these channels 421, 422, 423, 424 extend through the platform 42 in a lifting direction (Z). The receiving channels 422, the conveying channel 423 and the loading channels 424 extend along the transferring direction (X).

Referring to FIGS. 3 to 7, in combination with FIGS. 1 and 2, the loading unit 5 is disposed on the frame body 41, and includes two spaced-apart lift tracks 50, two loading slide rails 51, a loading lift group 52, a preparation slide rail 53, a preparation drive member 54 and a preparation pushing group 55.

The lift tracks 50 extend along the transferring direction (X), and are disposed in proximity to the loading channels 424. Each lift track 50 has an upper rail surface 501 facing upward toward the platform 42, a lower rail surface 502 opposite to the upper rail surface 501, and two inclined surfaces 503 formed on two opposite ends thereof and located between the upper and lower rail surfaces 501, 502. Each inclined surface 503 has an upper end 504 and a lower end 505.

The loading slide rails 51 extend along the transferring direction (X), and are disposed between the lift tracks 50.

The loading lift group 52 is movably disposed on the loading slide rails 51, and includes a sliding member 522 slidable on the loading slide rails 51, a lifting plate 523 liftably disposed on the sliding member 522, a plurality of rollers 524 pivoted to two opposite sides of the lifting plate 523 and rollable on the lift tracks 50, four loading push rods 525 inserted through the sliding member 522 and fixed to the lifting plate 523, and four limiting members 526 disposed on a bottom side of the sliding member 522. The loading push rods 525 are disposed on four corners of the loading lift group 52. Each loading push rod 525 has a ring groove 5251 formed in an outer periphery thereof and proximate to a bottom side thereof. The ring groove 5251 provides contact engagement with a respective one of the limiting members 526.

The preparation slide rail 53 extends along the transferring direction (X), and has a portion located between the loading slide rails 51. The preparation drive member 54 of this embodiment is a rodless cylinder movably disposed on the preparation slide rail 53.

Figure 3:
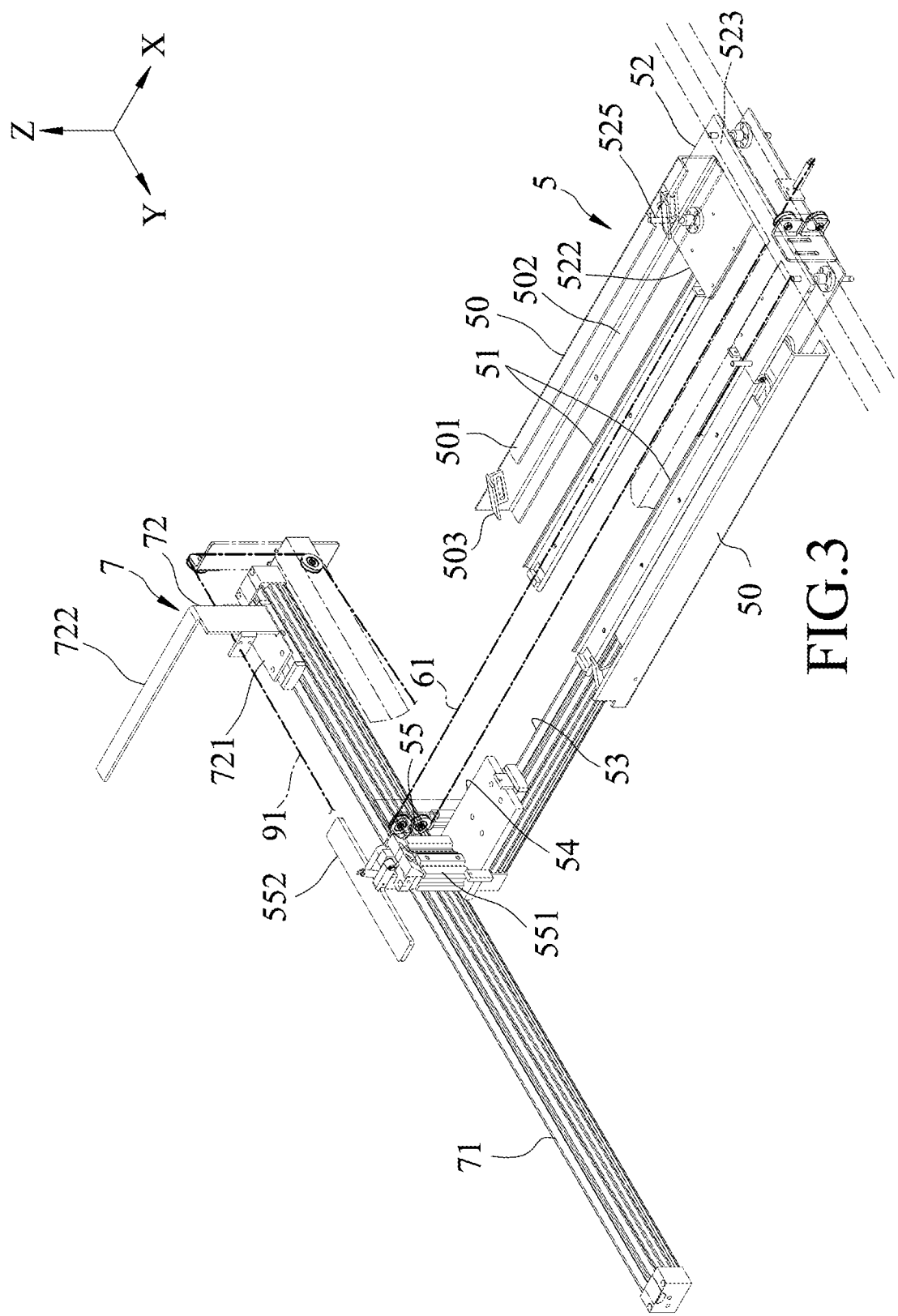
FIG. 3 is an enlarged perspective view of a portion of FIG. 2.
Figure 7:
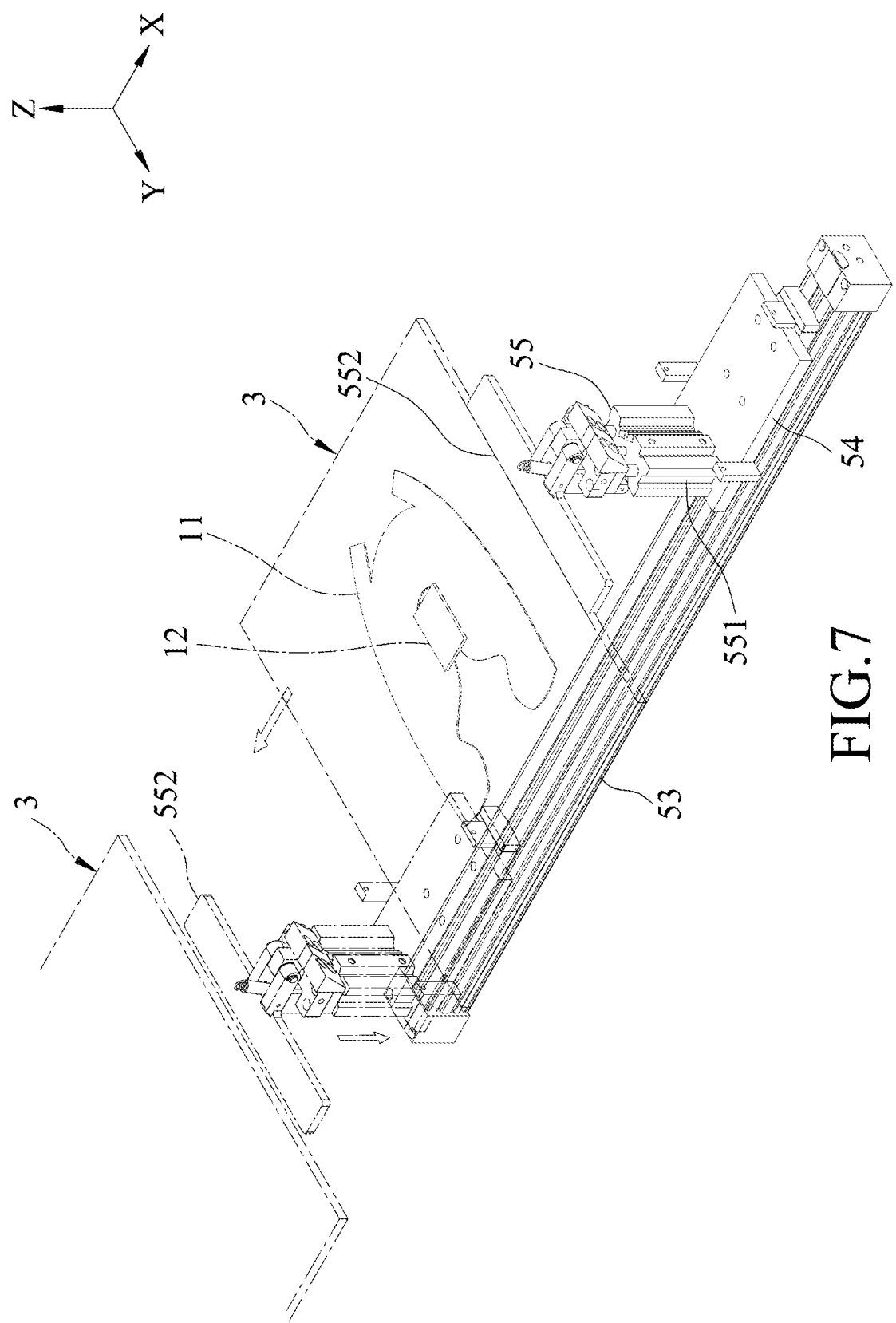
FIG. 7 is a partial perspective view of a preparation pushing group of the first embodiment.

With reference to FIGS. 2, 3 and 7, the preparation pushing group 55 includes a preparation drive cylinder 551 and a conveying push rod 552 fixed to a telescopic rod of the preparation drive cylinder 551. The preparation drive cylinder 551 is mounted on the preparation drive member 54, and can push the conveying push rod 552 to move along the lifting direction (Z).

The loading link unit 6 includes a loading link member 61, and a plurality of pulleys 62 mounted on the frame body 41. The loading link member 61 is a rope wound around the pulleys 62, and interconnects the preparation drive member 54 and the sliding member 522 of the loading lift group 52.

Figure 8:
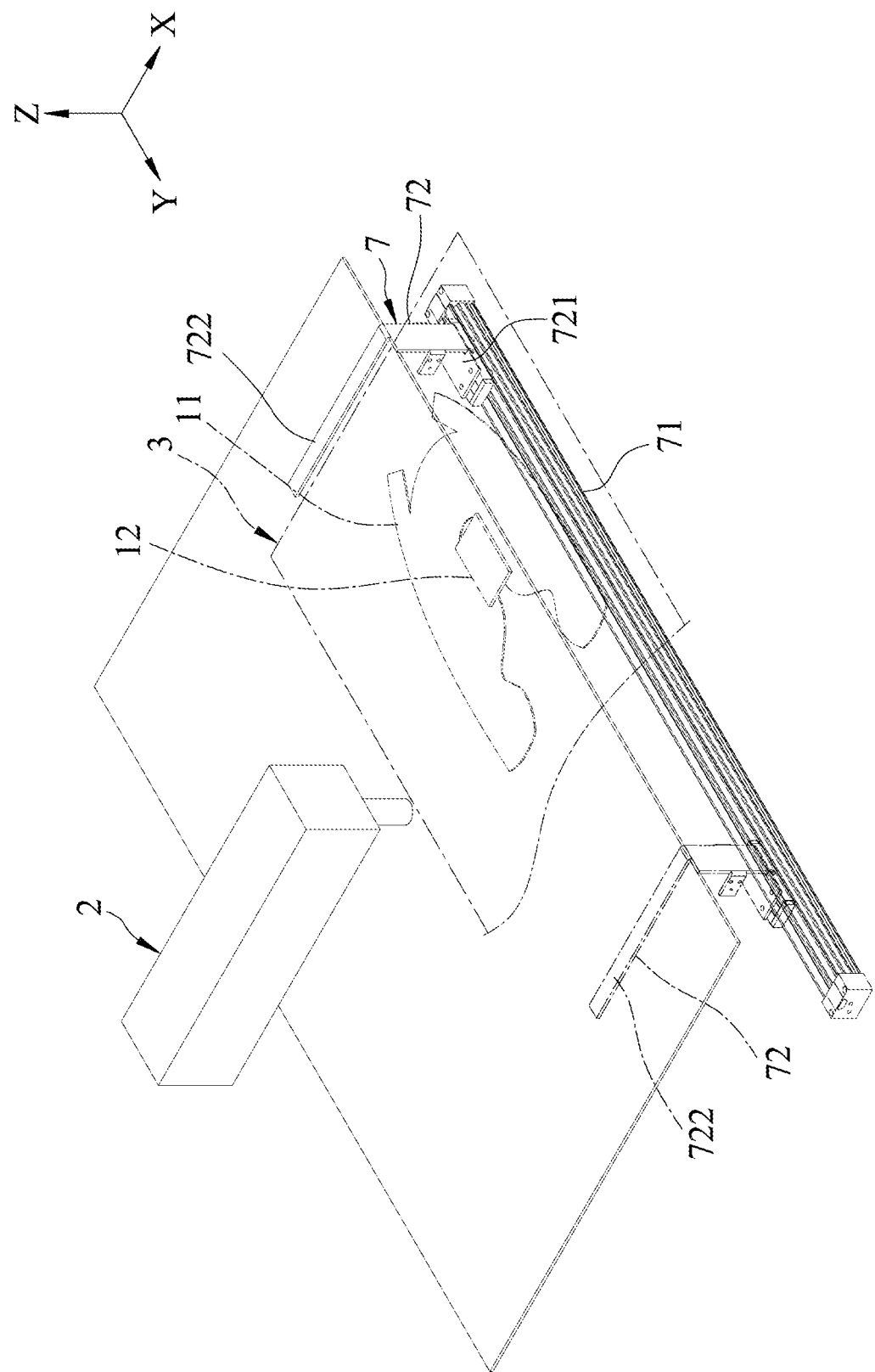
FIG. 8 is a partial perspective view of an unloading pushing member of the first embodiment.

Referring to FIG. 8, in combination with FIGS. 1 and 2, the unloading unit 7 is disposed on the frame body 41, and includes an unloading slide rail 71 and an unloading drive group 72. The unloading slide rail 71 corresponds in position to the unloading channel 421. The unloading drive group 72 is movably disposed on the unloading slide rail 71, and includes an unloading drive member 721, and an unloading pushing member 722 connected to the unloading drive member 721. The unloading drive member 721, for example, is a rodless cylinder. The unloading pushing member 722 extends out of the platform 42 through the unloading channel 421, so that the unloading drive member 721 can push the unloading pushing member 722 to move along the unloading slide rail 71.

Figure 9:
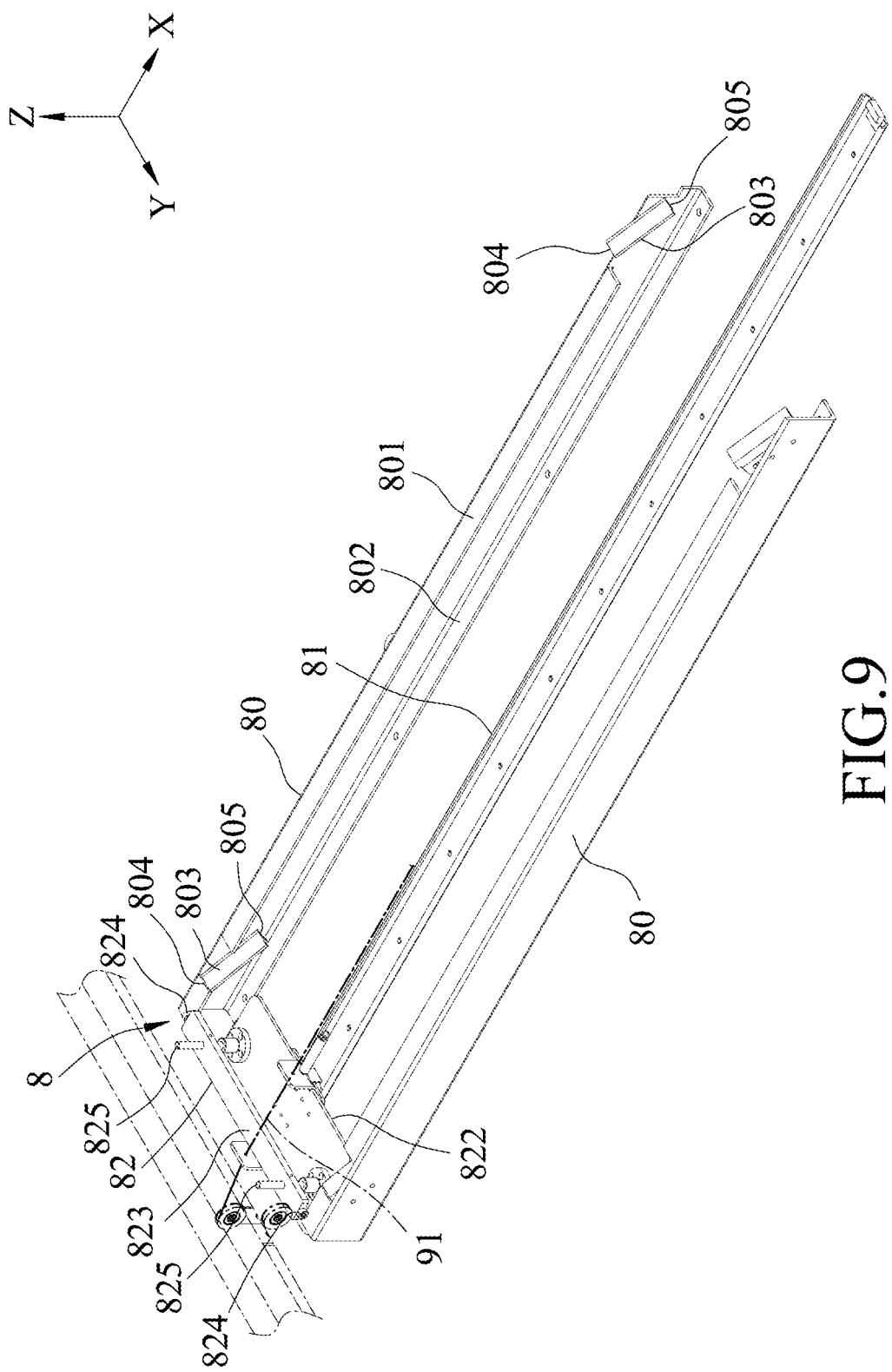
FIG. 9 is a partial perspective view of a receiving lift group of the first embodiment.
Figure 10:
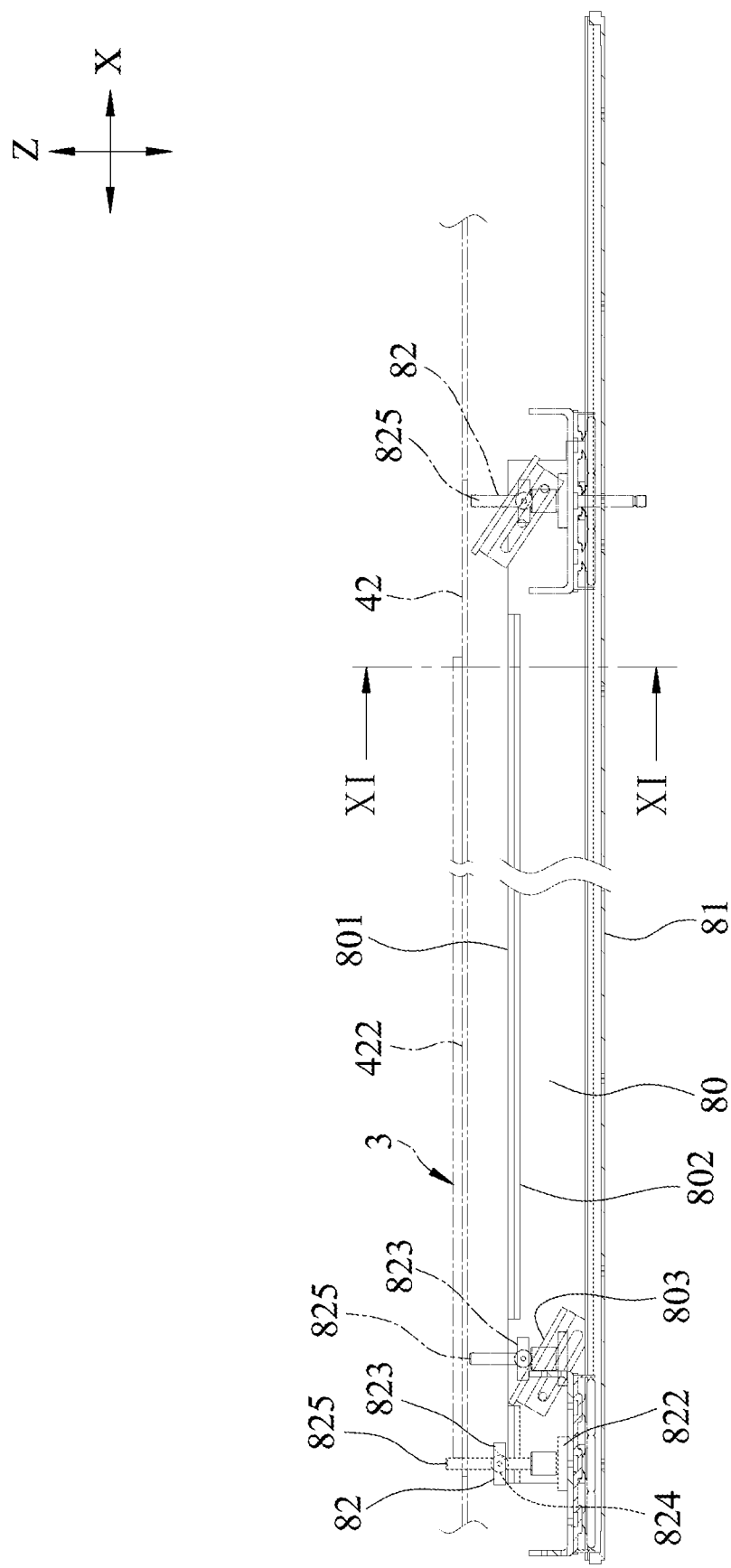
FIG. 10 is a partial sectional view of the receiving lift group of the first embodiment.
Figure 11:
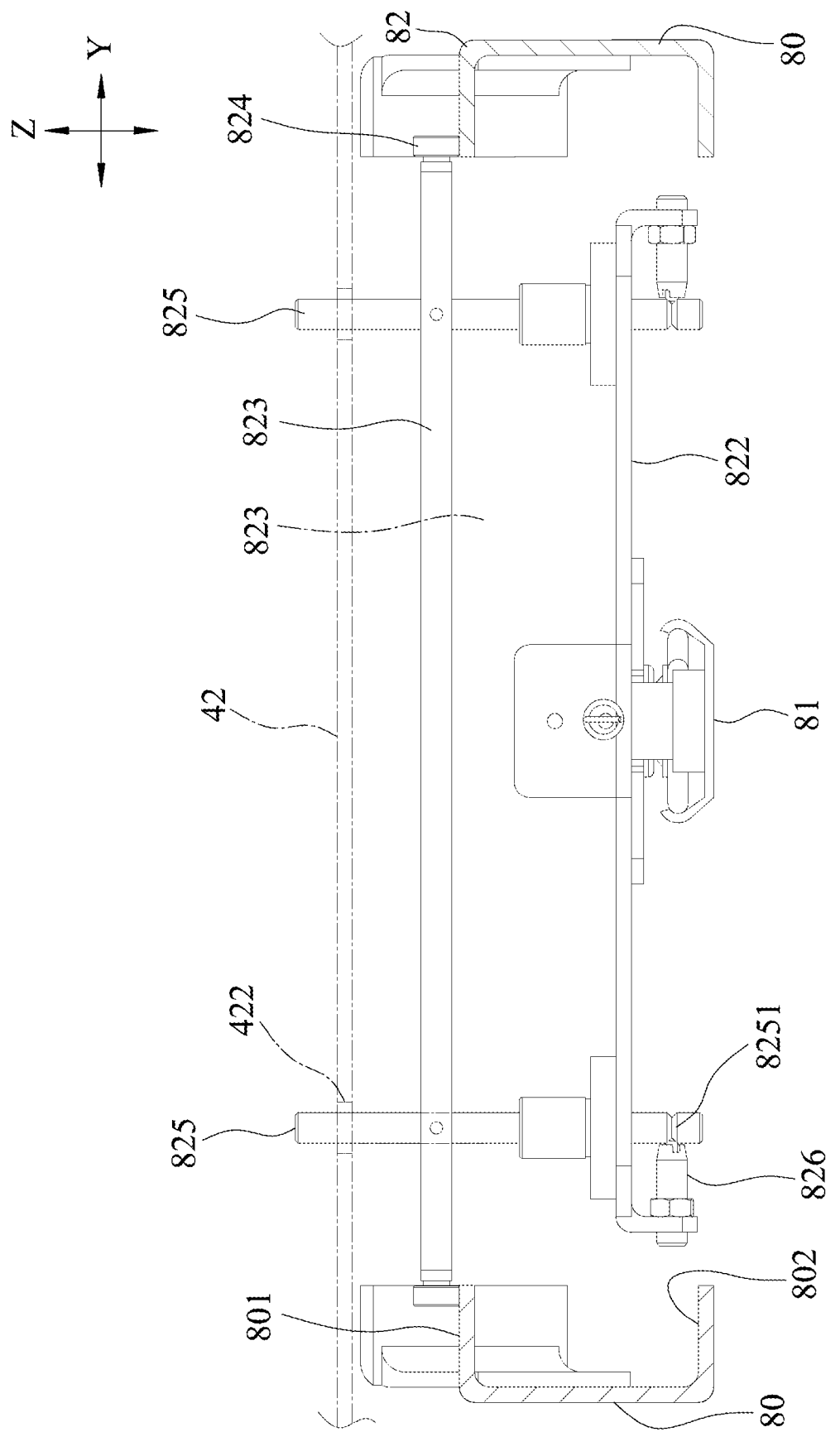
FIG. 11 is a sectional view of the first embodiment taken along line XI-XI of FIG. 10.
Figure 12:
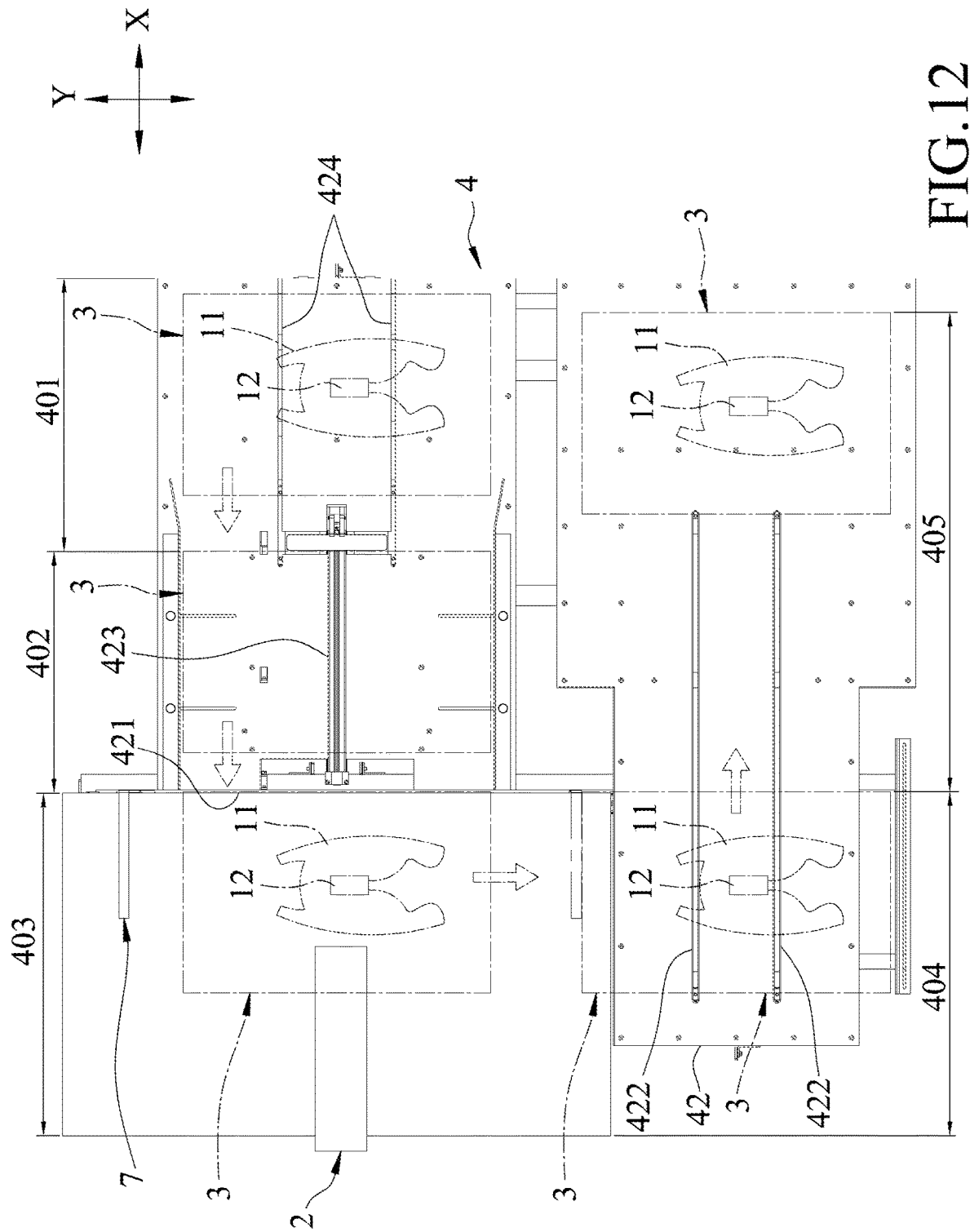
FIG. 12 is a schematic top view of the first embodiment.

Referring to FIGS. 9 to 11, in combination with FIG. 2, the receiving unit 8 includes two spaced-apart lift tracks 80, a receiving slide rail 81 and a receiving lift group 82.

The lift tracks 80 are disposed on the frame body 41 in proximity to the receiving channels 422. Each lift track 80 has an upper rail surface 801 facing upward toward the platform 42, a lower rail surface 802 opposite to the upper rail surface 801, and two inclined surfaces 803 formed on two opposite ends thereof and located between the upper and lower rail surfaces 801, 802. Each inclined surface 803 has an upper end 804 and a lower end 805.

The receiving slide rail 81 is disposed between the lift tracks 80, and extends along the transferring direction (X).

The receiving lift group 82 is movably disposed on the receiving slide rail 81, and includes a sliding member 822 slidable on the receiving slide rail 81, a lifting plate 823 liftably disposed on the sliding member 822, a plurality of rollers 824 pivoted to two opposite sides of the lifting plate 823 and rollable on the lift tracks 80, two receiving push rods 825 inserted through the sliding member 822 and fixed to the lifting plate 823, and two limiting members 826 disposed on a bottom side of the sliding member 822. The receiving push rods 825 are respectively disposed on two opposite ends of the receiving lift group 82. Each receiving push rod 825 has a ring groove 8251 formed in an outer periphery thereof and proximate to a bottom side thereof. The ring groove 8251 provides contact engagement with a respective one of the limiting members 826.

The receiving link unit 9 includes a receiving link member 91, and a plurality of pulleys 92 mounted on the frame body 41. The receiving link member 91 is a rope wound around the pulleys 92, and interconnects the unloading drive member 721 and the sliding member 822 of the receiving lift group 82.

The loading, unloading and receiving operations of a plurality of the plates 3 using the automatic loading and unloading device of this disclosure will be sequentially described below. Each plate 3 may be loaded with two shoe components, for example, an upper 11 and a decorative piece 12, as shown in FIG. 1.

Figure 4:
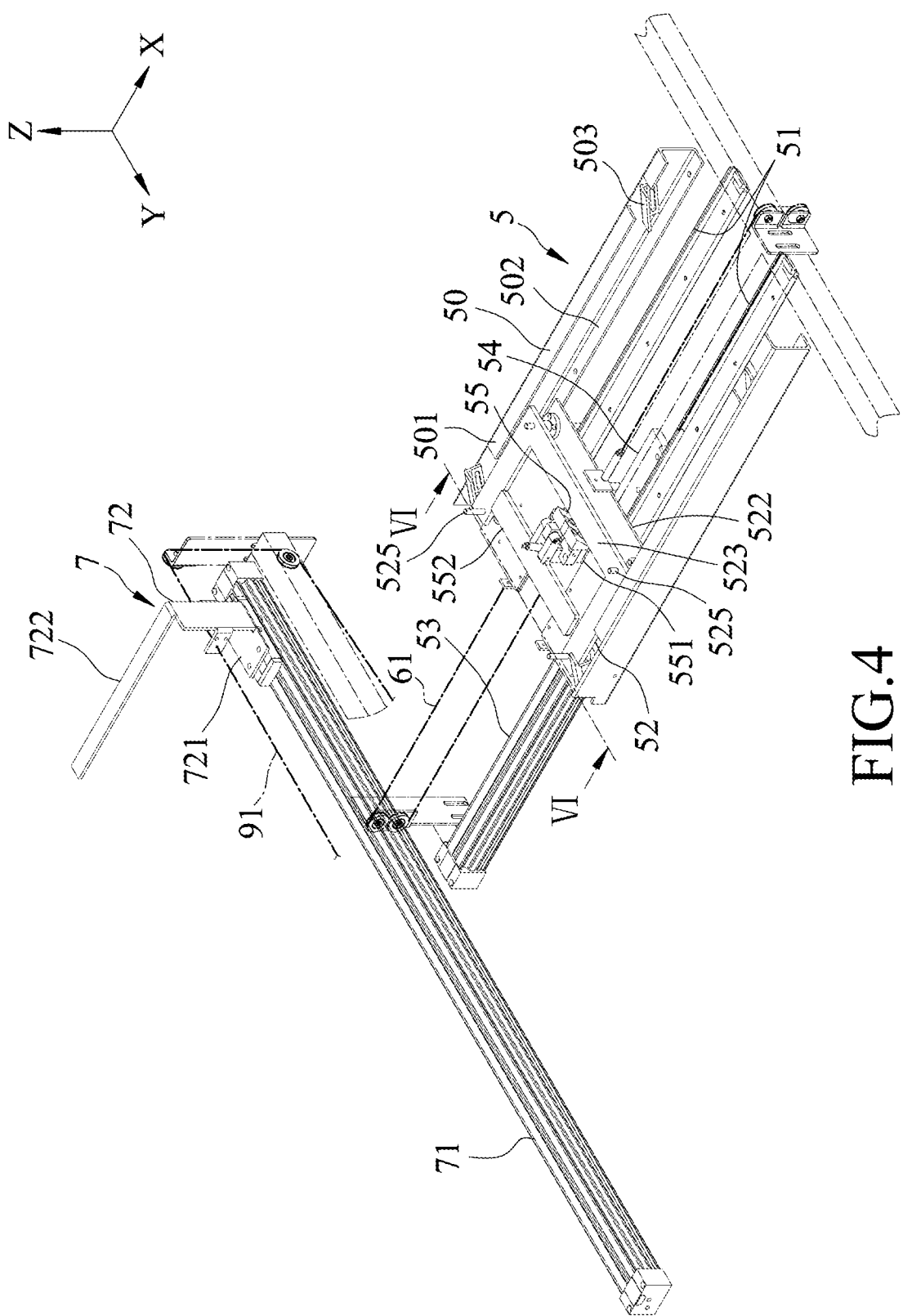
FIG. 4 is a view similar to FIG. 3, but illustrating a loading lift group being moved to a preparing position.
Figure 5:
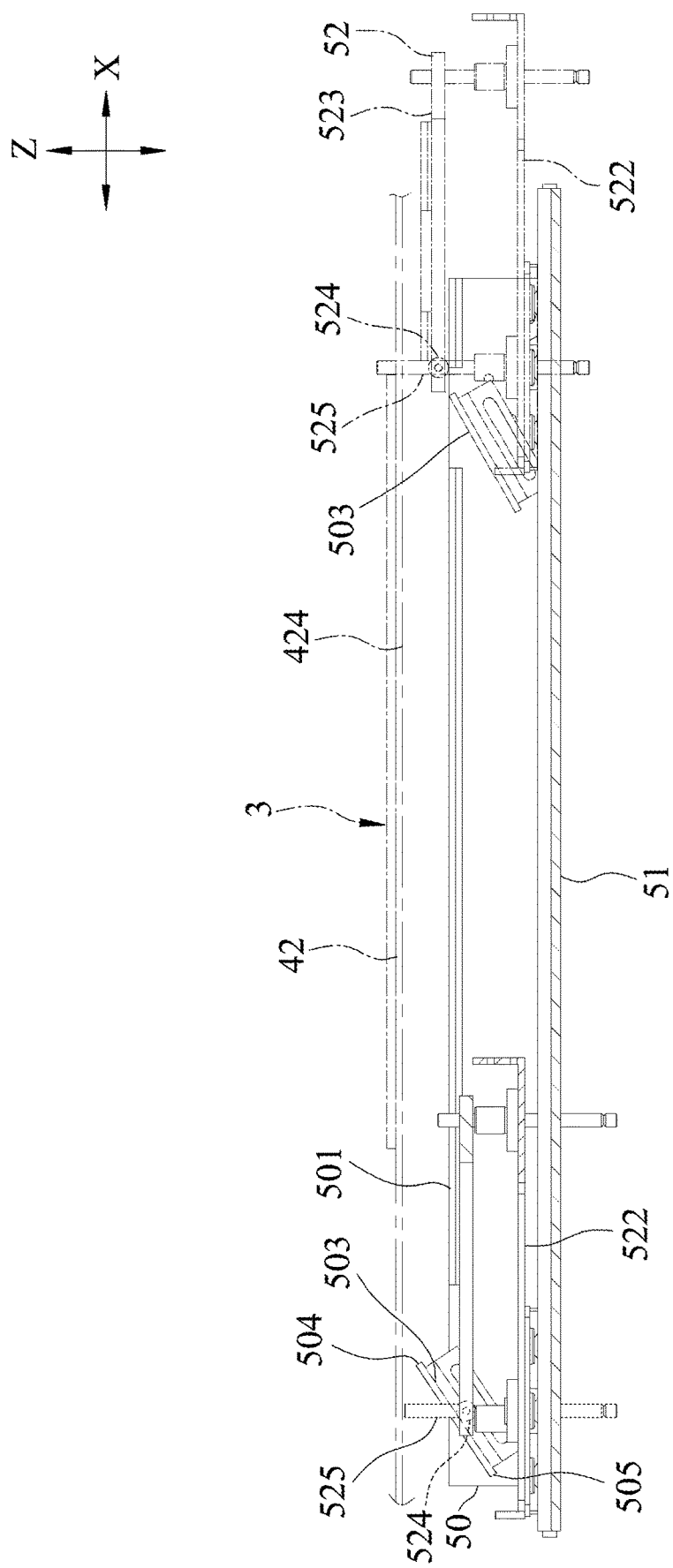
FIG. 5 is a partial sectional view of the first embodiment.
Figure 6:
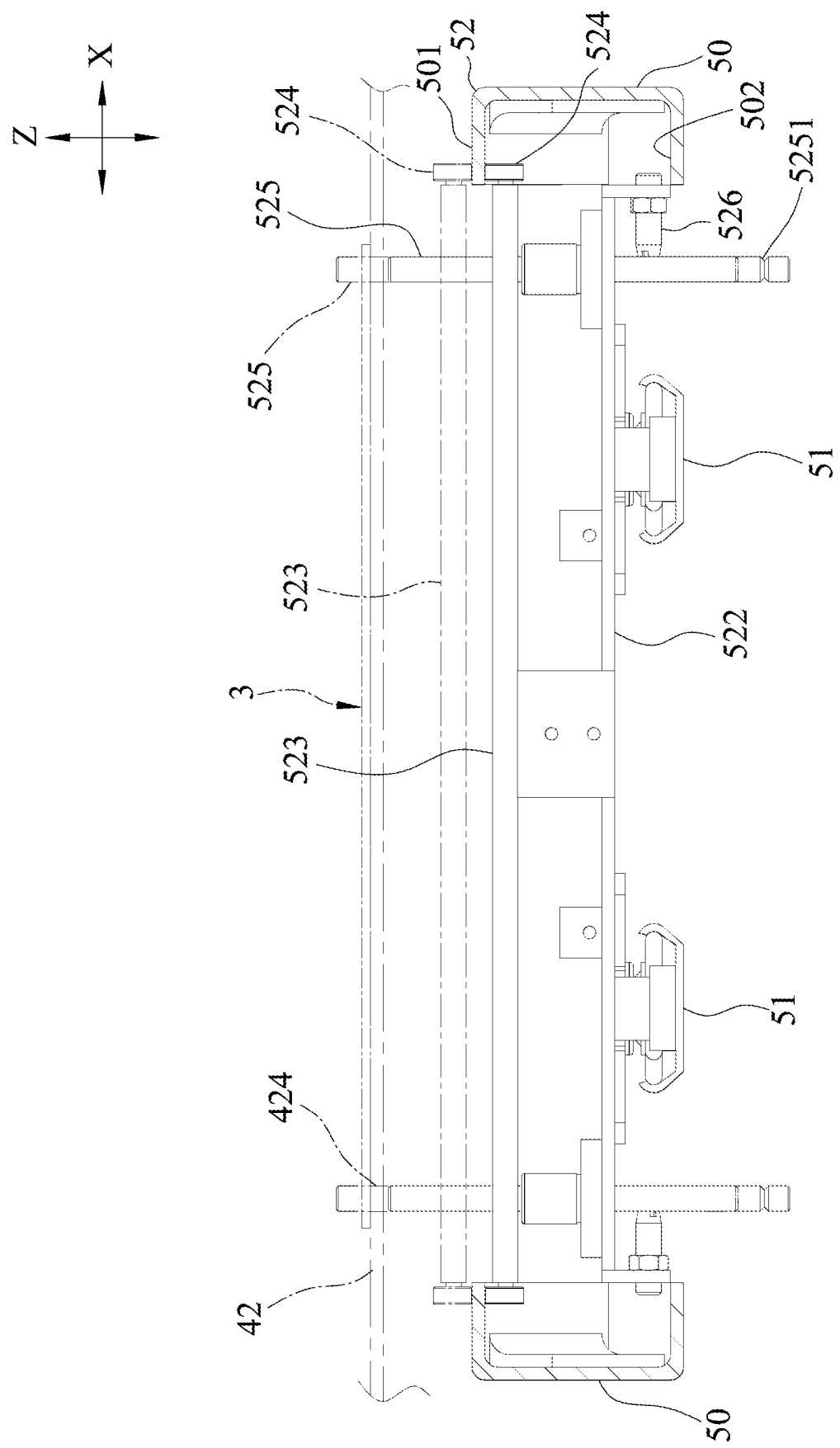
FIG. 6 is a sectional view of the first embodiment taken along line VI-VI of FIG. 4.

1. Loading operation:

Referring to FIGS. 1, 2 and 3 to 7, when an operator or a machine arm places one of the plates 3 loaded with the shoe components 11 and 12 on the preparation area 401 of the platform 42, the loading link member 61 is activated to pull the loading lift group 52 from a loading position, as shown in FIG. 3, in which the loading lift group 52 is located in the preparation area 401 away from the loading area 402, to a preparing position, as shown in FIG. 4, in which the loading lift group 52 is adjacent to the loading area 402. At this time, the loading push rods 525 extend out of the loading channels 424, and push the one of the plates 3 to move from the preparation area 401 to the loading area 402 along the transferring direction (X).

During movement of the loading lift group 52 from the loading position (see FIG. 3) to the preparing position (see FIG. 4), the rollers 524 roll on the upper rail surfaces 501 of the lift tracks 50, and move from the upper ends 504 to the lower ends 505 of the inclined surfaces 503 when in contact with the inclined surfaces 503 that are proximate to the loading area 402, thereby overcoming the blocking forces of the limiting members 526, so that the lifting plate 523 can descend toward the lower rail surface 502 until the rollers 524 are located between the upper and lower rail surfaces 501, 502 of the lift tracks 50. At the same time, each loading push rod 525 is driven to descend from a loading exposed position (the loading push rods 525 being shown in imaginary lines in FIGS. 5 and 6) to a loading hidden position (the loading push rods 525 shown in solid lines in FIGS. 5 and 6), so that each loading push rod 525 is located below a horizontal surface of the one of the plates 3. Since a height of each loading push rod 525 in the loading hidden position is lower than its height in the loading exposed position, the loading push rods 525 can move along with the loading lift group 52 back to the loading position, as shown in FIG. 3, without interfering with the plate 3.

It is worth to mention herein that, during movement of the loading lift group 52 from the preparing position to the loading position, the rollers 524 located below the upper rail surfaces 501 of the lift tracks 50 will move until they contact the inclined surfaces 503 which are adjacent to the preparation area 401, and move from the lower ends 505 to the upper ends 504 of the inclined surfaces 503, so that the lifting plate 523 ascends in a direction away from the sliding member 522 until the limiting members 526 contact the ring grooves 5251 of the loading push rods 525 and generate blocking forces that prevent the loading push rods 525 from moving further upward. At this time, the rollers 524 contact the upper rail surfaces 501 of the lift tracks 50, and drive each loading push rod 525 to ascend from the loading hidden position to the loading exposed position through the lifting plate 523.

2. Preparation Operation:

Referring to FIGS. 1 to 4 and 7, when the preparation drive member 54 is in a feeding position, as shown in FIG. 4, in which the preparation drive member 54 is proximate to the loading area 402, the preparation drive cylinder 551 will push the conveying push rod 552 to move from a conveying hidden position (the conveying push rod 552 being shown in imaginary line in FIG. 7), in which the conveying push rod 552 is hidden beneath the platform 42, to a conveying exposed position (the conveying push rod 552 being shown in solid line in FIG. 7), in which the conveying push rod 552 extends out of the conveying channel 423 of the platform 42. Through this, when the preparation drive member 54 is moved along the preparation slide rail 53 from the feeding position (see FIG. 4) to an unloading position (see FIG. 3), in which the preparation drive member 54 is proximate to the processing area 403, the conveying push rod 552 that extends out of the conveying channel 423 can push the one of the plates 3 located at the loading area 402 to enter the processing area 403 along the transferring direction (X). At the same time, the loading push rods 525 extending out of the loading channels 424 can synchronously push the next plate 3 from the preparation area 401 to the loading area 402 along the transferring direction (X). By repeating the aforesaid steps, only one preparation drive member 54 is used to push each plate 3 from the preparation area 401 to the loading area 402, and to synchronously push the plate 3 located originally at the loading area 402 to enter the processing area 403 for processing.

3. Unloading Operation:

Referring to FIGS. 1, 2 and 8, after the processing of the shoe components 11 and 12 loaded on the one of the plates 3 by the stitching machine 2 is completed, the unloading drive member 721 is moved along the unloading slide rail 71 from a processing position (the unloading pushing member 722 being shown in solid line in FIG. 8), in which the unloading drive member 721 is away from the unloading area 404, to a processing completion position (the unloading pushing member 722 being shown in imaginary line in FIG. 8), in which the unloading drive member 721 is proximate to the unloading area 404, and drives the unloading pushing member 722 to push and move the one of the plates 3 loaded with the processed shoe components 11 and 12 from the processing area 403 to the unloading area 404.

4. Receiving Operation:

Referring to FIGS. 1, 2, and 8 to 12, when the unloading drive member 721 is moved from the processing completion position back to the processing position along the unloading slide rail 71, the receiving link member 91 will pull the receiving lift group 82 to move from an unloading position (the receiving lift group 82 being shown in solid lines in FIGS. 9 and 10), in which the receiving lift group 82 is located at the unloading area 404 and is proximate to the processing area 403, to a receiving position (the receiving lift group 82 being located at the rightmost side of FIG. 10), in which the receiving lift group 82 is located at the receiving area 405 and is adjacent to the preparation area 401. At this time, the receiving push rods 825 are located at a receiving exposed position (the receiving push rods 825 being shown in solid lines in FIGS. 10 and 11) that extend out of the receiving channels 422 of the platform 42, and push the one of the plates 3 loaded with the processed shoe components 11 and 12 to move from the unloading area 404 to the receiving area 405 along the transferring direction (X).

During movement of the receiving lift group 82 from the unloading position to the receiving position, as shown in FIG. 10, the rollers 824 rolling on the upper rail surfaces 801 of the lift tracks 80 will contact the inclined surfaces 803 of the lift tracks 80 which are proximate to the receiving area 405, and sequentially move from the upper ends 804 to the lower ends 805 of the inclined surfaces 803, thereby overcoming the blocking forces of the limiting members 826, so that the lifting plate 823 descends toward the sliding member 822, until the rollers 824 contact the lower rail surfaces 802 of the lift tracks 80, and drive each receiving push rod 825 to descend from the receiving exposed position to a receiving hidden position (the receiving push rods 825 being shown in imaginary lines in FIGS. 10 and 11) located beneath the horizontal surface of the plate 3. Through this, the height of each receiving push rod 825 at the receiving exposed position is higher than its height at the receiving hidden position along the lifting direction (Z).

During movement of the unloading drive member 721 from the processing completion position back to the processing position along the unloading slide rail 71, the receiving lift group 82 is pulled by the receiving link member 91 to move from the receiving position to the unloading position. At this time, since each receiving push rod 825 is located at the receiving hidden position and does not extend out of the platform 42, each receiving push rod 825 can move along with the receiving lift group 82 back to the unloading position without interfering with the plate 3.

During movement of the receiving lift group 82 from the receiving position to the unloading position, the rollers 824 located on the upper rail surfaces 801 of the lift tracks 80 will move until they contact the inclined surfaces 803 of the lift tracks 80 which are proximate to the unloading area 404, and then sequentially move from the lower ends 805 to the upper ends 804 of the inclined surfaces 803, so that the lifting plate 823 ascends in a direction away from the sliding member 822, until the limiting members 826 contact the ring grooves 8251 of the receiving push rods 825 to generate blocking forces. Further, the rollers 824 contact the upper rail surfaces 801, and drive each receiving push rod 825 to ascend from the receiving hidden position to the receiving exposed position through the lifting plate 823. By repeating the aforesaid steps, only one unloading drive group 72 is used to push each plate 3 loaded with the processed shoe components 11 and 12 to move from the unloading area 404 to the receiving area 405, and tp synchronously push the plate 3 located originally at the processing area 403 to enter the unloading area 404.

Through this, the operator or the machine arm that faces the preparation area 401 and the receiving area 405 does not need to change his/its position, and can place the plate 3 loaded with shoe components 11 and 12 to be processed on one side and receive the plate 3 loaded with shoe components 11 and 12 that have been processed on another side.

It is worth to mention herein that the loading link unit 6 and the receiving link unit 9 composed of the aforementioned ropes and pulleys may also achieve the purpose of linkage through a brake line group.

Figure 13:
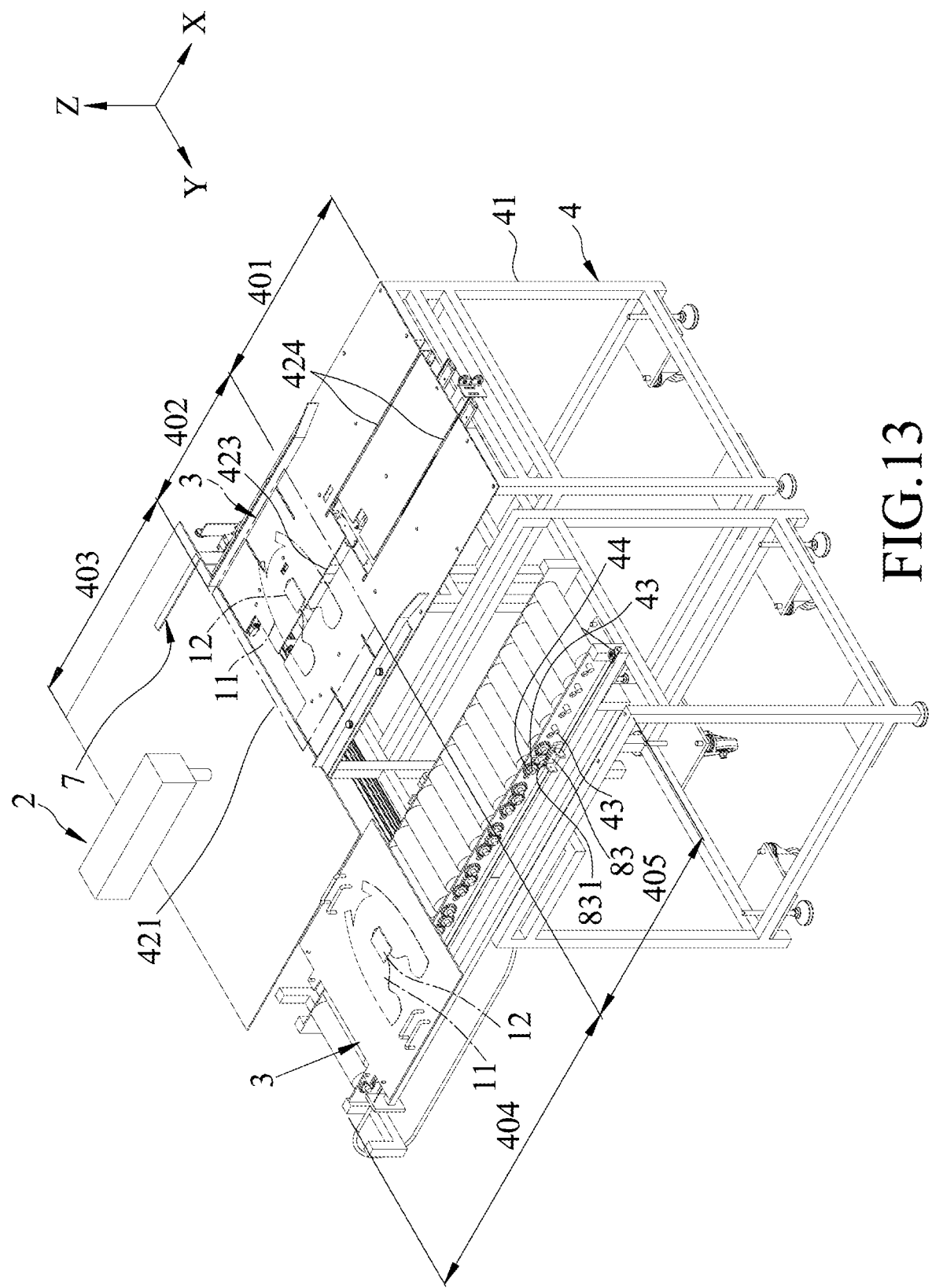
FIG. 13 is a perspective view of an automatic loading and unloading device according to the second embodiment of the present disclosure.

Referring to FIG. 13, the second embodiment of the automatic loading and unloading device of this disclosure is shown to be identical to the first embodiment. However, in this embodiment, the frame 4 further includes a plurality of roller shafts 43 and a plurality of gears 44. The roller shafts 43 are journalled on the frame body 41, and are arranged from the unloading area 404 to the receiving area 405 along the transferring direction (X). Each gear 44 is connected to one side of a corresponding one of the roller shafts 43 located at the unloading area 404. Each gear 44 rotates coaxially with the corresponding roller 43.

The receiving unit 8 further includes a sliding member 83 connected to the receiving link member 91 (see FIG. 2). The sliding member 83 has a meshing portion 831 meshing with a corresponding one of the gears 44. Due to linkage with the receiving link member 91, the sliding member 83 can move reciprocally within the unloading area 404, so that the meshing portion 831 of the sliding member 82 can sequentially drive the gears 44 to rotate, and sequentially drive the roller shafts 43 to rotate, thereby facilitating movement of the plate 3 loaded with the processed shoe components 11 and 12 to the receiving area 405 through the roller shafts 43.

It should be noted herein that the automatic loading and unloading device of this disclosure is not limited to installing the stitching machine 2. In other variations of this embodiment, processing equipment, such as spot welding machine, roughing machine, etc, may also be installed. The purpose of loading, automatic preparation, automatic unloading and automatic receiving may be similarly achieved.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. An automatic loading and unloading device suitable for automatically moving at least one plate, said automatic loading and unloading device comprising:
    a frame defining a processing area that is suitable for receiving the at least one plate along a transferring direction, an unloading area disposed on one side of said processing area, and a receiving area disposed on one side of said unloading area that is away from said processing area;
    an unloading unit disposed on said frame and including an unloading slide rail extending along an unloading direction perpendicular to the transferring direction, and an unloading drive group movably disposed on said unloading slide rail for driving the at least one plate to move from said processing area to said unloading area along the unloading direction;
    a receiving unit disposed on said frame and including a receiving slide rail extending along the transferring direction, and a receiving lift group movably disposed on said receiving slide rail for driving the at least one plate to move from said unloading area to said receiving area along the transferring direction; and
    a receiving link unit interconnecting said unloading drive group and said receiving lift group such that when said unloading drive group moves along said unloading slide rail, said unloading drive group can synchronously drive said receiving lift group to move along the transferring direction.

2. The automatic loading and unloading device as claimed in claim 1, wherein said unloading drive group includes an unloading drive member, and an unloading pushing member connected to said unloading drive member, said unloading pushing member being driven by said unloading drive member to move relative to said unloading slide rail between a processing position, in which said unloading pushing member is away from said unloading area, and a processing completion position, in which said unloading pushing member is proximate to said unloading area, said unloading pushing member being suitable for pushing the at least one plate to move from said processing area to said unloading area along the unloading direction.

3. The automatic loading and unloading device as claimed in claim 2, wherein said receiving lift group is movable relative to said receiving slide rail between an unloading position, in which said receiving lift group is located in said unloading area and is proximate to said processing area, and a receiving position, in which said receiving lift group is located in said receiving area, said receiving lift group including at least one receiving push rod which is movable relative to said receiving slide rail between a receiving exposed position and a receiving hidden position along a lifting direction perpendicular to the transferring direction and the unloading direction, a height of said at least one receiving push rod in said receiving exposed position being higher than in said receiving hidden position, said at least one receiving push rod being suitable for driving the at least one plate to move to said receiving area along the transferring direction when in said receiving exposed position, and being located below a horizontal surface of the at least one plate when in said receiving hidden position.

4. The automatic loading and unloading device as claimed in claim 3, wherein:
    said receiving unit further includes two lift tracks, each of said lift tracks having an upper rail surface, a lower rail surface opposite to said upper rail surface, and two inclined surfaces formed on two opposite ends of a corresponding one of said lift tracks and located between said upper rail surface and said lower rail surface;
    said receiving lift group further includes a sliding member slidable on said receiving slide rail, a lifting plate movably disposed on said sliding member, and a plurality of rollers pivoted to two opposite sides of said lifting plate, said receiving lift group including two said receiving push rods movably disposed on said sliding member and connected to said lifting plate;

said inclined surface on one of said two opposite ends of each of said lift tracks is used to guide one of said rollers to roll on said upper rail surface, said inclined surface on the other one of said two opposite ends of each of said lift tracks being used to guide said one of said rollers to be located below said upper rail surface;

when said two receiving push rods are in said receiving exposed position, said rollers roll on said upper rail surface and drive said lifting plate to move in a direction away from said sliding member; and, when said two receiving push rods are in said receiving hidden position, said rollers are located below said upper rail surface and drive said lifting plate to move toward said sliding member.

5. The automatic loading and unloading device as claimed in claim 4, wherein said receiving lift group further includes at least two limiting members disposed on said sliding member, each of said receiving push rods having a ring groove formed in an outer periphery thereof, each of said limiting members being used to contact said ring groove of a respective one of said receiving push rods for generating a blocking force that maintains each of said receiving push rods in said receiving exposed position.

6. The automatic loading and unloading device as claimed in claim 4, wherein:

said frame includes a frame body, a plurality of roller shafts and a plurality of gears, said roller shafts being journalled on said frame body and being arranged from said unloading area to said receiving area along the transferring direction, each of said gears being connected to one side of a corresponding one of said roller shafts located at said unloading area and being coaxially rotatable with the corresponding one of said roller shafts; and said receiving unit further includes a sliding member movably disposed on said receiving slide rail, said receiving slide rail extending through said unloading area, said sliding member having a meshing portion meshing with a corresponding one of said gears and reciprocally movable within said unloading area such that said meshing portion of said sliding member can sequentially drive said gears to rotate and can sequentially drive said roller shafts to rotate, said roller shafts being configured for driving the at least one plate to said receiving area.

7. The automatic loading and unloading device as claimed in claim 4, wherein said receiving link unit includes a receiving link member, and a plurality of pulleys mounted on said frame, said receiving link member being a rope wound around said pulleys and interconnecting said unloading drive member and said sliding member of said receiving lift group.

8. The automatic loading and unloading device as claimed in claim 1, further comprising a loading unit, said frame further defining a loading area, said loading unit including a preparation slide rail extending along the transferring direction, a preparation drive member movably disposed on said preparation slide rail, and a preparation pushing group mounted on said preparation drive member, said preparation drive member being movable relative to said preparation slide rail between a feeding position, in which said preparation drive member is proximate to said loading area, and an unloading position, in which said preparation drive member is proximate to said processing area and is suitable for pushing the at least one plate to move from said loading area to said processing area along the transferring direction.

9. The automatic loading and unloading device as claimed in claim 8, wherein said preparation pushing group includes a preparation drive cylinder mounted on said preparation drive member, and a conveying push rod, said conveying push rod being pushed by said preparation drive cylinder to move relative to said preparation drive member along a lifting direction between a conveying exposed position, in which said conveying push rod is suitable for driving the at least one plate to move along the transferring direction, and a conveying hidden position, in which the conveying push rod is located below a horizontal surface of the at least one plate, a height of said conveying push rod in said conveying exposed position being higher than in said conveying hidden position.

10. The automatic loading and unloading device as claimed in claim 9, wherein said said frame further defines a preparation area spaced apart from said processing area along the transferring direction, said loading unit including at least one loading slide rail extending along the transferring direction, and a loading lift group movably disposed on said loading slide rail, said loading lift group being movable relative to said loading slide rail between a loading position, in which said loading lift group is located in said preparing area away from said loading area, and a preparing position, in which said loading lift group is proximate to said loading area, said loading lift group including at least one loading push rod that is movable relative to said preparation drive member along the lifting direction between a loading exposed position, in which said at least one loading push rod is suitable for driving the at least one plate to move from said preparing area to said loading area along the transferring direction, and a loading hidden position, in which said at least one loading push rod is located below the horizontal surface of the at least one plate.

11. The automatic loading and unloading device as claimed in claim 10, further comprising a loading link unit which includes a loading link member interconnecting said preparation drive member and said loading lift group such that when said loading lift group is located in said loading position, said preparation drive member is located in said unloading position, and when said loading lift group is located in said preparing position, said preparation drive member is located in said feeding position.

12. The automatic loading and unloading device as claimed in claim 11, wherein said loading link unit further includes a plurality of pulleys mounted on said frame, said loading link member being a rope wound around said pulleys and interconnecting said preparation drive member and said loading lift group.

* * * * *